United States Patent [19]
Barlow et al.

[11] Patent Number: 5,682,244
[45] Date of Patent: *Oct. 28, 1997

[54] AUTOMATED OPTICAL DETECTION OF TISSUE PERFUSION BY MICROSPHERES

[76] Inventors: Clyde H. Barlow, 6307 Tamoshan Dr., NW., Olympia, Wash. 98502; Jeffrey J. Kelly, 5735 Cedar Flats Rd. SW., Olympia, Wash. 98512

[ * ] Notice: The term of this patent shall not extend beyond the expiration date of Pat. No. 5,422,730.

[21] Appl. No.: 421,799

[22] Filed: Apr. 13, 1995

Related U.S. Application Data

[63] Continuation-in-part of Ser. No. 218,156, Mar. 25, 1994, Pat. No. 5,422,730.

[51] Int. Cl.$^6$ .................... G01N 21/27; G01N 21/64; A06B 6/03
[52] U.S. Cl. ............. 356/417; 250/458.1; 250/459.1
[58] Field of Search ................. 356/417; 250/458.1, 250/459.1

[56] References Cited

U.S. PATENT DOCUMENTS

| | | | |
|---|---|---|---|
| 3,649,108 | 3/1972 | Ahrens et al. | 352/84 |
| 4,573,195 | 2/1986 | de France | 356/39 X |
| 5,230,343 | 7/1993 | Guberek et al. | 356/319 |
| 5,292,512 | 3/1994 | Schaefer et al. | 424/401 |

*Primary Examiner*—Vincent P. McGraw
*Attorney, Agent, or Firm*—Bennet K. Langlotz

[57] ABSTRACT

A method and apparatus for optical detection and imaging of regional circulatory flow in biological tissues for research purposes. An animal or plant organ is perfused with a saline suspension of colored and/or fluorescent microspheres. The organ is excised and fixed in the form of a specimen block for mounting in a microtome or other suitable apparatus. Under automatic control of a microcomputer equipped with a frame grabber, a surface layer of the block is removed, the resulting new exposed surface of the block receives a flash of illumination from a light source, and light reflected by colored microspheres or, alternatively, light emitted by fluorescent microspheres, is detected by a CCD video camera aimed at the block. Also under microcomputer control, light filters having suitable light bandpasses are interposed between the light sources and the block, and between the block and the camera. Video signals are converted by the microcomputer into position coordinates with associated optical intensities from which regional circulatory flow is computed and displayed on a monitor. The microspheres may be segregated into batches each having a different permutation of a set of distinct colors, such that an extended sequence of interventions may be conducted using a limited number of different colors.

12 Claims, 6 Drawing Sheets

5,682,244

AUTOMATED OPTICAL DETECTION OF TISSUE PERFUSION BY MICROSPHERES

CROSS REFERENCE TO RELATED APPLICATION

This is a continuation in part of U.S. patent application Ser. No. 08/218,156, filed Mar. 25, 1994, U.S. Pat. No. 5,422,730. A written disclosure of this invention was submitted pursuant to the Invention Disclosure Program on Dec. 28, 1992, Disclosure Ser. No. 322511.

This invention was made with government support, grant HL 50898, awarded by the National Institutes of Health. The government has certain rights in the invention.

FIELD OF THE INVENTION

The present invention relates generally to the field of optical detection and imaging of circulatory flow in biological tissues for research purposes.

BACKGROUND AND SUMMARY OF THE INVENTION

This invention provides a method and apparatus for optical detection and video display of regional circulatory flow in an animal or plant organ perfused with a suspension of fluorescent or colored microspheres. The invention also encompasses an automated method and apparatus for calculating regional circulatory flow in biological tissues.

Radioactive microspheres are conventionally used for detecting and measuring circulatory flow in the organs of laboratory research animals and plants. Such information can reveal, for example, regions of restricted blood flow in heart and other animal organs. Microspheres of appropriate diameter are injected into the circulation of live test animals (or plants) and lodge in regions where the diameter of the circulatory system is smaller than that of the microsphere. The animal is then sacrificed and the tissue or organ of interest is carefully dissected into small volume elements. The resolution of the method can not exceed the number of the volume elements so either the method has low spatial resolution or the tissue must be dissected into many volume elements. Each tissue volume element is then individually weighed and processed, which conventionally involves extracting and filtering or ashing, adding solutions and counting the radioactivity with a scintillation counter. An alternative method employs colored microspheres, uses the same sample preparation steps, and determines the color intensity extracted from each volume element with a spectrophotometer. These current practices are labor intensive (extensive handling and keeping track of numerous tissue volume elements), require costly supplies and reagents, and produce radioactive samples and radioactive animal carcasses; furthermore, selection of the tissue volume elements must be done before analysis, can be done only once, and yields low spatial resolution of microsphere location.

An object of the invention, therefore, is to provide an improved method and apparatus for determining circulatory flow in animal and plant organs, particularly for biological and medical research purposes, using suspensions of microspheres.

Another object of the invention is to provide means to determine the precise three-dimensional location of each microsphere within biological tissues that have been perfused with a suspension of microspheres.

A further object of the invention is to eliminate the need for extensive pretreatment of biological tissues before determination of circulatory flow by microsphere analysis.

A still further object of the invention is to fully automate the sequential removal of surface layers from a fixed specimen of a biological organ, as well as the detection and analysis of microspheres within each successive layer of the specimen, thereby greatly reducing the cost of labor and supplies utilized during circulatory flow measurements.

Yet another object of the invention is to provide a digital computer monitor display of the distribution of all microspheres in perfused tissues.

Another object of the invention is to provide a digital computer software program that assures registration of microsphere locations between sequential images from microsphere fluorescence that is observable at depths greater than a single layer.

It is still another object of the invention to permit post-sectioning determination of the tissue volume elements thus permitting multiple criteria for circulatory flow analysis of a single specimen, whereby multiple experiments can be performed on one animal.

Yet another object of the invention is to eliminate the need for the use of radioactive microspheres, thereby eliminating the handling and disposing of radioactive samples and carcasses, and the accompanying human radioactive exposures.

The present invention encompasses a method and apparatus utilizing suspensions of microspheres for determining circulatory flow in the organs of animals and plants. Microspheres of a particular color or fluorescence characteristic, and of appropriate size, are suspended in saline solution and injected into the circulation of a selected biological organ. The suspension of microspheres is allowed time to perfuse the tissues of the organ. If desired, one or more experimental parameters can then be changed, such as temperature, pH, etc., and the process can then be repeated using microspheres of a different color or fluorescence characteristic. The organ is excised and frozen (or fixed with a biological fixative such as glutaraldehyde) to form a specimen block. Surface layers are sequentially removed from the tissue block, preferably by a cryomicrotome or, alternatively, by a grinding machine, a reciprocating or rotary cutting blade, or a milling machine. While the serial removal of surface layers proceeds, one or more light sources provide illumination to the exposed surfaces of the tissue block—in the case of colored microspheres to provide reflectance illumination and, in the case of fluorescent microspheres, to provide fluorescence excitation. Excitation filters having appropriate band-passes are interposed between the light sources and the specimen block to maximize the light reflectance from selected colored microspheres or, in the case of fluorescent microspheres, to maximize the fluorescence excitation of the microspheres. A video camera aimed at the specimen block receives an image of each exposed surface of the specimen by means of the reflected or fluorescent light from the specimen block, and converts the image into a pattern of electrical signals comprising a series of video frames. Emission filters are interposed between the specimen block and the video camera having band-passes that permit the detection of the location of microspheres of different colors or fluorescence characteristics. The electrical signals from the video camera are communicated to a digital computer equipped with a frame grabber, an input/output board, and a hard disk. The computer performs data storage and analysis, including digitizing and storing each 1/30th second one full resolution video frame by a 512×480×8 video frame grabber. Images for each light wavelength are signal averaged and stored before the next layer is removed from the specimen block. The computer also computes the three-dimensional location of each microsphere in the specimen block and creates a display on the computer monitor of the density of the microspheres as a function of depth. Apparatus and a computer software program are provided for automating these procedures under the control of a digital computer, including automated control of slice removal from a specimen block, illumination timing, filter selection, image acquisition, data reduction and storage, tissue flow calculation, and flow region display.

Additional advantages are generated by providing a test kit comprising a first batch of injectable particles having a first detectable characteristic, a second batch of injectable particles having a second detectable characteristic distinguishable from the first characteristic, and a third batch of injectable particles having both the first characteristic and the second characteristic.

The kit may include additional batches of particle, with a multitude of permutations of different characteristics in addition to the first and second characteristics. The kit may be used in a method of analyzing fluid flow through a mass of tissue by first injecting a first batch of first particles into the tissue, each of the first particles having a first detectable characteristic. Then, injecting a second batch of second particles into the tissue, each of the second particles having a second detectable characteristic distinguishable from the first characteristic. Then, segmenting the tissue into a plurality of segments and analyzing the particles in each segment to determine fluid flow characteristics at the first and second times. The method may include the step, after injecting the second batch, injecting a third batch of third particles into the tissue, each of the third particles having the first characteristic and the second characteristic.

BRIEF DESCRIPTION OF THE DRAWINGS

With reference to FIG. 1, the term "front" shall refer to the right side of longitudinal axis A and the term "rear" shall refer to the left side of axis A.

DETAILED DESCRIPTION OF THE ILLUSTRATED EMBODIMENT

The apparatus and methods of our invention are intended to utilize colored and fluorescent microspheres for injection into the circulation of test animals and plants for measuring regional circulatory flow. Suitable latex microspheres of diameter 9 to 25 microns are available for this purpose, for example, from Molecular Probes, Inc., of Eugene, Oreg., under the trademark FLUOSPHERES blood-flow kits. The microspheres are suspended in 0.2% Tween 20 (Sigma Chemical Company) in normal saline, sonicated, and mechanically shaken before injection to ensure minimal aggregation.

Figure 1:
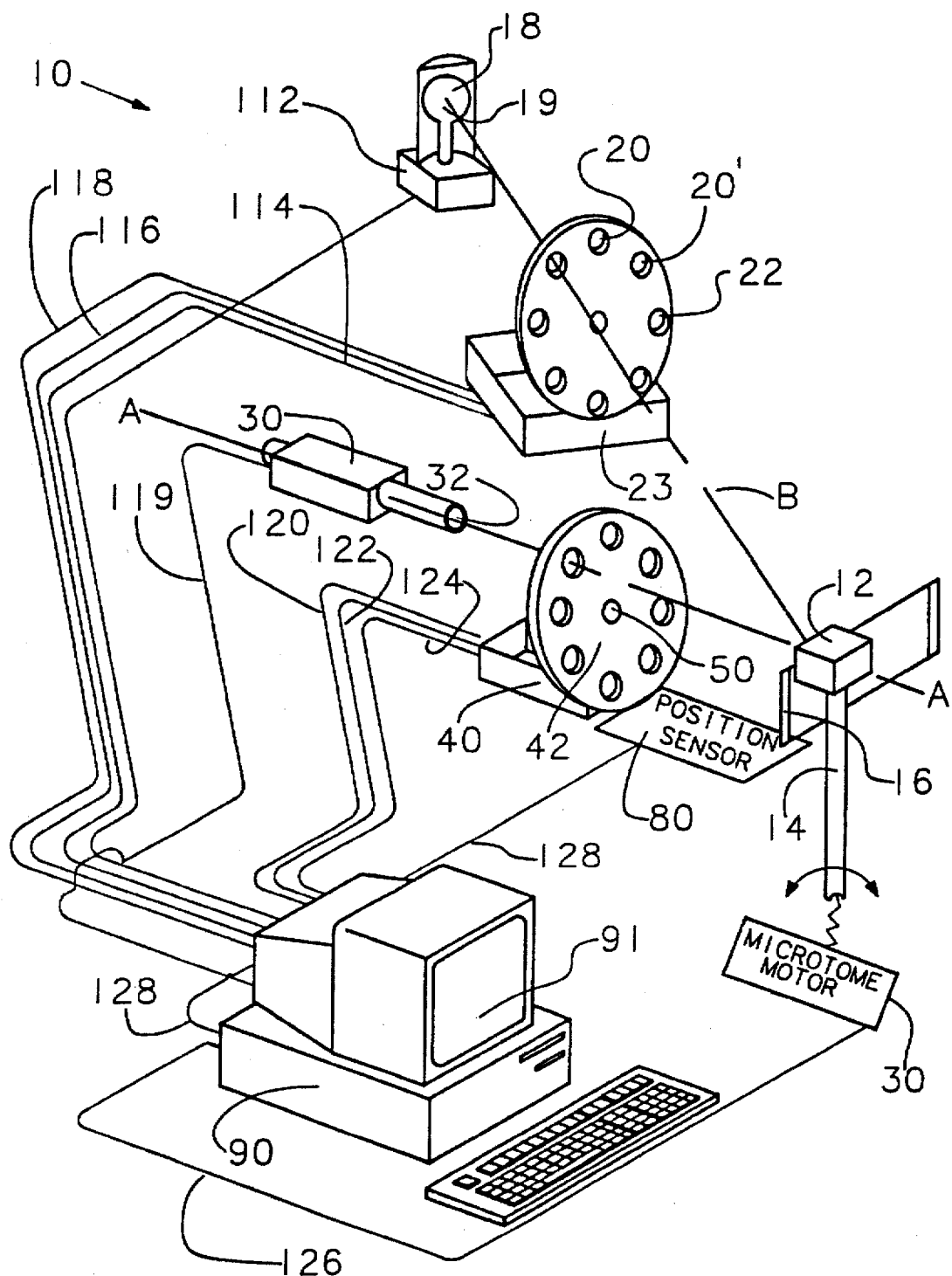
FIG. 1 is a schematic perspective view of apparatus for practicing the methods of the invention under automatic control of a digital microcomputer.
Figure 6:
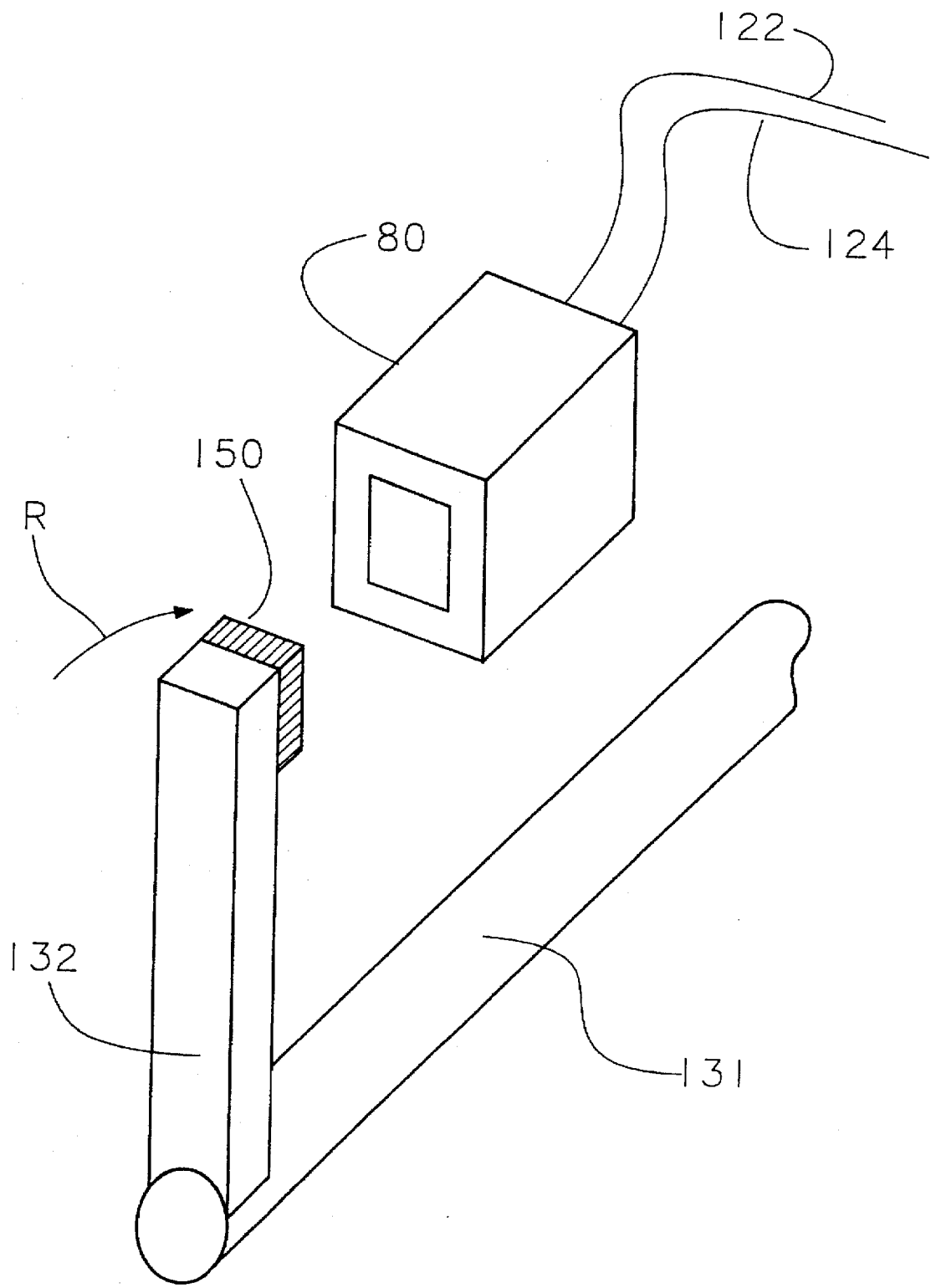
FIG. 6 is a schematic perspective view of a rotating magnet and Hall-effect switch for sensing a start position for the specimen block.

Apparatus 10 for practicing the methods of our invention is illustrated in schematic perspective in FIG. 1 in a preferred embodiment. A specimen block 12 has been prepared according to the methods of the invention and contains a fixed animal or plant organ that has been perfused with a suspension of colored, phosphorescent or fluorescent microspheres. The specimen block 12 is mounted to a specimen arm 14 of a microtome (or, in the case of fixation by freezing, a cryomicrotome—e.g., American Optical 840C Cryogenic Microtome) for sequential removal of surface layers from the specimen block by reciprocating movement of the specimen block past a stationary knife 16. Alternatively, the specimen block 12 may be stationary, and surface layers may be sequentially removed therefrom by reciprocating movement of the knife 16. One or more light sources 18 is provided for flash illumination of the specimen block 12. When fluorescent microspheres are employed, each light source 18 preferably includes a xenon flash tube 19 and flash capacitor mounted in a flash control box (not shown), or a mercury arc lamp. A specimen position sensor 80 provides means for sensing that the specimen block 12 is at a first position and ready to begin a cycle of movement toward and through the knife 16 and return to a start position. As illustrated in FIG. 1, in the preferred embodiment the specimen position sensor 80 is a Hall-effect switch detector positioned adjacent to some reproducible specimen block start position. The specimen position sensor comprises a small magnet mounted on a rotating sensor-mount arm 132 attached to the microtome drive shaft 131, as illustrated in FIG. 6. A Hall-effect switch (for example, Model #SS41, Microswitch Company) mounted in close proximity to the arc R of the rotating magnet 150 senses the position of the passing magnet 150 and supplies a digital signal through signal line 126 to a computer soilware program to turn off the microtome motor 130 when the block 12 is at a start position. Digital pulses from the microcomputer 90 are conducted by signal line 124 to the microtome motor 130, which is preferably a stepper motor.

Figure 3:
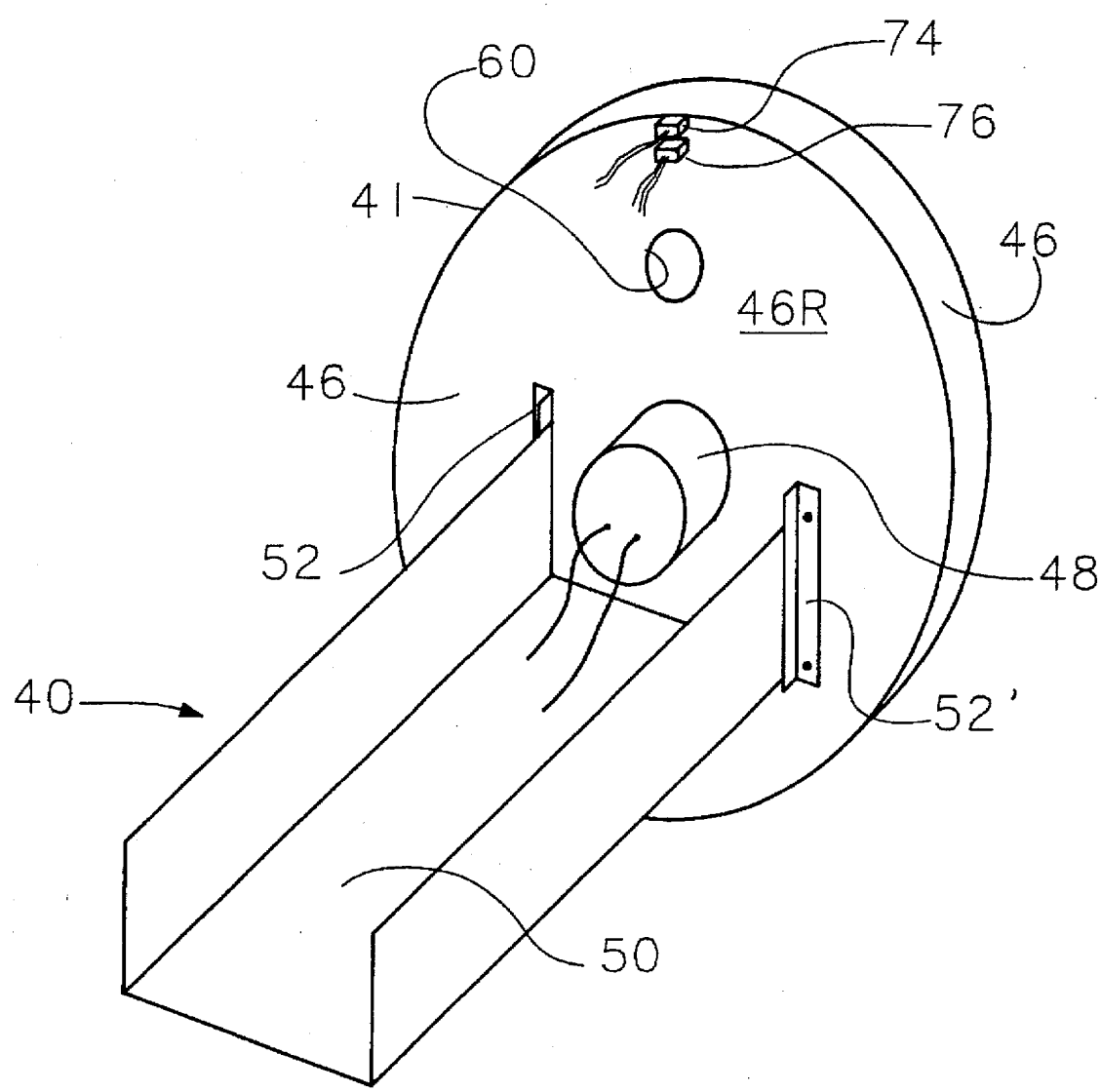
FIG. 3 is a rear perspective view of the detection filter assembly with electronic components, camera and camera mount removed.
Figure 4:
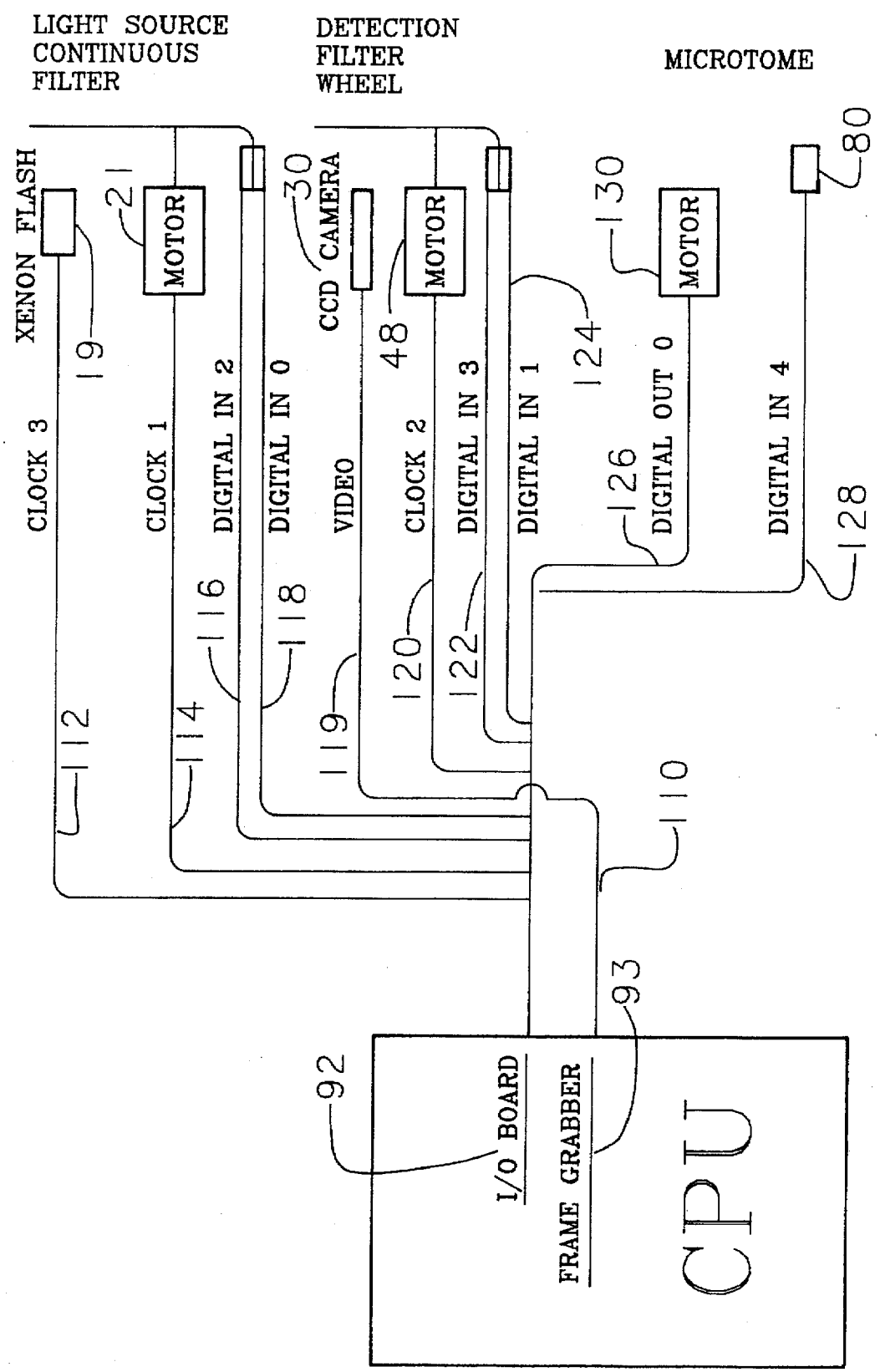
FIG. 4 is a schematic diagram showing the input and output line connections between the components of the apparatus and the Input/Output Board and Frame Grabber of the microcomputer.

For each light source 18, an excitation filter wheel assembly 23, including a rotatable excitation filter wheel 22 and associated electric drive means and control electronics, is provided and aligned on a common axis, for instance, axis B in FIG. 1. That is, interposed between each light source 18 and the specimen block 12, and mounted in a rotatable excitation filter wheel 22, are one or more excitation filters 20, 20' for selecting a desired frequency band of light for illuminating the specimen block 12. For example, for yellow microspheres (15 micrometer diameter, yellow/green FluoSpheres, Molecular Probes, Inc.), the desired wavelength maximum for excitation is 490 nm for which an Omega Optical 485DF22 filter provides a 485 nm center wavelength with 22 nm bandwidth, is suitable. For red FluoSpheres with a 570 nm maximum excitation, an Omega Optical 560DF40 filter with 560 nm center wavelength and 40 nm bandwidth is suitable. For yellow-green fluorescent microspheres, the desired excitation bandwidth is 430–500 nm for which an Omega Optical 485 DF22 filter is suitable, and the appropriate detection filter bandwidth is 500–560 nm, for which Omega Optical 530 DF30 filter is suitable. The excitation filter wheel 22 is under automatic control of a microcomputer 90 by means of signal lines 114, 116, and 118 for sequentially and repeatedly inserting between a light source 18 and the specimen block 12 two or more excitation filters 20, 20,' etc., having different light frequency bandpasses. The construction and operation of the excitation filter wheel assembly 23 is substantially the same as that for the detection filter wheel assembly 40, as described below and as illustrated in FIGS. 2, 3 and 4, except that a light source aperture takes the place of a camera aperture.

A video camera 30 is longitudinally mounted on axis A with its lens 32 pointed toward the specimen block 12. Preferably, the video camera 30 is of the type equipped with a charge coupled device, i.e., a "CCD camera," with a 760×480 pixel array and a low f-number lens 32. A suitable camera for this purpose is the Sony XC-77 CCD video camera. Interposed between the camera 30 and the specimen block 12 is a detection filter wheel assembly, denoted generally by the numeral 40. Referring to FIG. 3, it may be seen that the detection filter wheel assembly 40 includes a shroud 41 comprised of a circular backing plate 44 and a rim 46 that extends forward from the periphery of the backing plate 44. Centrally mounted to a rear surface 46R of the backing plate 46 is an electric motor 48, preferably a stepper motor, with the drive shaft 50 thereof inserted through a central aperture of the backing plate 46. Radially outward from the central aperture is a camera mount aperture 60 to permit light reflected or emitted from the specimen block 12 to pass through the backing plate 46 and enter the lens 32 of the camera 30. A detection filter wheel 42 is mounted to the motor shaft 50 for rotation within the shroud 44. A housing 50 for mounting electronic components (not shown) for actuating and detecting partial rotations of the detection filter wheel 42 under automatic control of a microcomputer 90 is attached to a rear surface 46R of the backing plate 46 by a pair of mounting brackets 52, 52'.

Figure 2:
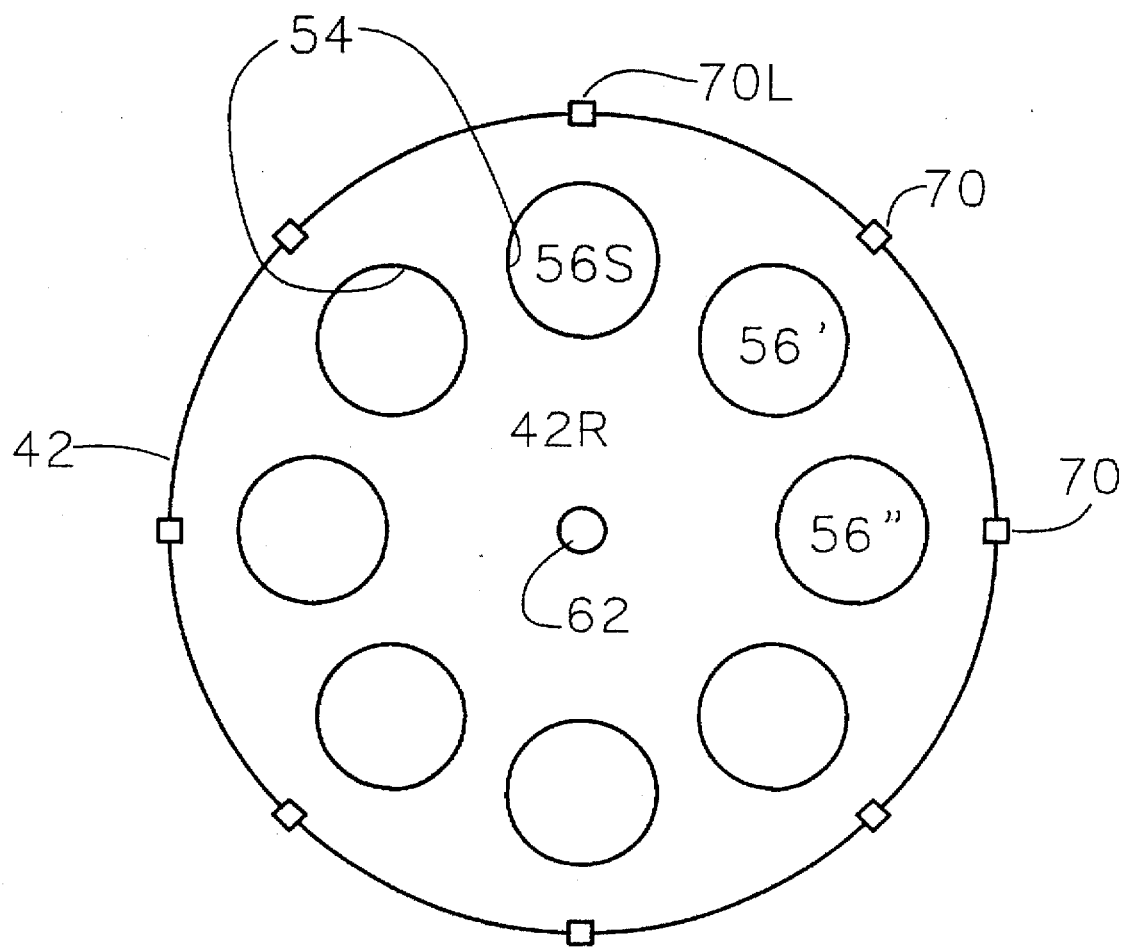
FIG. 2 is an enlarged, rear elevational view of a detection filter wheel thereof.

Referring now to FIG. 2, it may be seen that the detection filter wheel 42 is a disk having a central aperture 62 adapted for receiving the motor drive shaft 50. As described above, suitable disk-shaped detection filters are available from Omega Optical Company for selecting desired light frequency bands when colored or fluorescent microspheres are employed. Therefore, a plurality of circular cutouts 54 of suitable size are distributed around the periphery of the wheel 42 for reversible mounting of two or more detection filters 56, 56', 56", etc., to the detection filter wheel 42.

In order to sequentially interpose each detection filter 56, 56', 56", etc., between the camera lens 32 and the specimen block 12, it is necessary to execute a sequence of partial rotations of the detection filter wheel 42 that will, in sequence, place each of the detection filters 56, 56', 56", etc., adjacent to the camera mount aperture 60. Accordingly, the detection filter wheel assembly 40 further comprises means for detecting the position of the detection filters 56, 56', 56", etc., with respect to the camera mount aperture 60. In the preferred embodiment, a light-reflecting tab 70 is positioned radially outwardly from each detection filter 56, 56', 56", etc., on a rear surface 42R of the detection filter wheel 42 and extending inwardly from the periphery thereof; said tabs 70 are relatively short in length (preferably 0.5 to 1.0 cm). The location of a detection filter 56S occupying a start position on the detection filter wheel 42 is indicated by a relatively long (preferably longer than 1.0 cm) light-reflecting tab 70L positioned radially outward from the start position filter 56S and extending radially inward from the periphery of the wheel 42. A first optoelectronic sensor 74 is mounted to the backing plate 46 at or near (preferably within 0.5 cm) the periphery thereof, for rotational alignment with all the tabs, 70, 70L. A second optoelectronic sensor 76 is mounted to the backing plate 46 radially inward from the first optoelectronic sensor 76 for rotational alignment with the relatively long tab 70L only. Therefore, suitable cutouts are provided in the backing plate 46 for mounting the first and second optoelectronic sensors 74, 76 such that light reflected from any one of the tabs 70, as well as light reflected from tab 70L, when said tabs are rotationally aligned with sensor 74, will induce an electric signal in sensor 74; however, sensor 76 will only generate an electric signal when tab 70L is rotationally aligned with it. The electric signals so induced in the sensors 74, 76 serve as control signals for signaling when each of the filters 56S, 56', 56", etc., are aligned adjacent to the camera mount aperture 60.

With reference to FIG. 4, it may be seen that electric signals are conducted from the video camera 30 to the frame grabber 93 by signal line 110. Signal lines are provided for connecting to the input/output board 92 a xenon flash tube 19 (line 112); light source filter controller 110 comprising a light source controller motor (line 114) and light source position sensor 111 (lines 116 and 118); detection filter assembly motor 48 (line 120); specimen position sensor 80—e.g., Hall-effect switch (lines 122 and 124); microtome motor 130 (line 126); and specimen arm controller 140 (line 128). A microcomputer 90 equipped with a central processing unit ("CPU"), monitor 91, hard disk memory, input/output board 92, and a frame grabber 93, and capable of generating a plurality of clock pulses, is programmed with a computer software program for automated control of data collection according to the following program logic:

Program Logic: Automated Control of Data Collection

I. Rotate excitation filter to a first position.
  A. Turn on clock 1 for stepper motor drive 21.
  B. Test digital input 0 for electro-optical detection of excitation filter initial position. When True, disable clock 1 to stop motor 21.
II. Rotate detection filter 56S to a first position.
  A. Turn on clock 2 for stepper motor 48 of the detection filter wheel assembly 40.
  B. Test digital input for electro-optical detection of filter wheel 42 initial position. When True, set digital out 0 low to stop motor 48.
III. Remove one section from specimen block 12 and position specimen block 12.
  A. Set digital output 0 high to nm microtome motor 130.
  B. Test digital input 4 for specimen position sensor (Hall-effect switch) 80 detection of specimen block 12 at start position. When True, set digital out 0 low to stop the microtome motor 130.
IV. Record image of specimen block 12.
  A. Test frame grabber 91 for the presence of a vertical retrace indicating a break between video frames.
  B. When vertical retrace occurs, send single pulse to clock 3 to trigger xenon flash tube(s) 19 to flash and to initiate grabbing of an image, and transfer image to random access memory of the microcomputer 90 in the form of microsphere coordinates x,y, and an optical intensity I associated with each set of coordinates x,y.
  C. Store the microsphere coordinates and associated optical densities on the hard disk of the microcomputer 90.
V. Advance excitation and detection filters to next position for a different color of microsphere or different characteristic fluorescence of microsphere.

A. Rotate excitation filter 20, 20' to next position.
   1. Turn on clock 1 to start stepper motor 21.
   2. Test digital input 2 for electro-optical detection of excitation filter 20, 20' incremental position. When True, disable clock 1 to stop motor 21.
B. Rotate detection filters 56, 56', 56", etc. to next incremental position.
   1. Turn on clock 2 for stepper motor 48.
   2. Test digital input 3 for electro-optical detection of detection filter wheel 42 incremental position. When True, disable clock 2 to stop motor 48.

VI. Repeat steps IV and V until all of the colors and/or characteristic fluorescences of the injected microspheres have been imaged and the coordinates and optical intensities thereof stored on the hard disk of the microcomputer 90.

VII. Repeat steps I to VI until all of the microspheres in the specimen block 12 have been imaged and microsphere coordinates with associated optical intensities stored on the hard disk.

Figure 5:
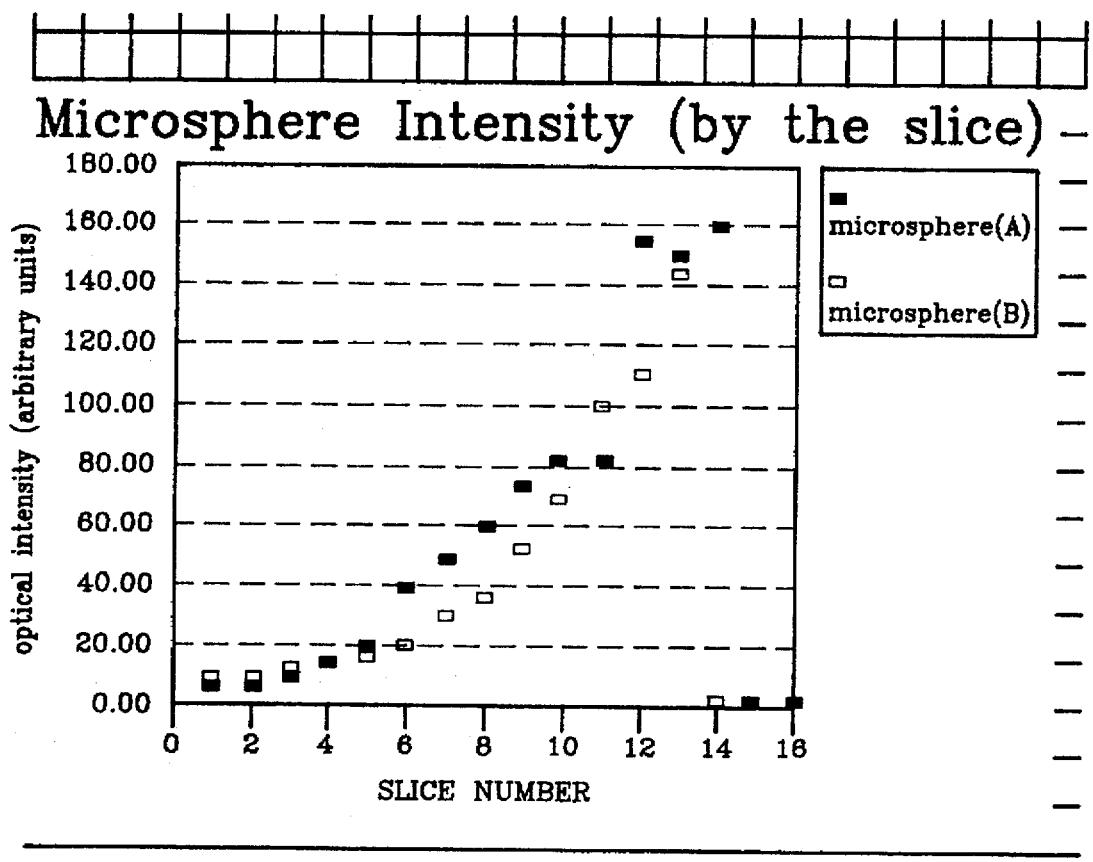
FIG. 5 is a graph showing simultaneous detection of fluorescence from fluorescent microspheres at different depths (slices) of a rat heart specimen treated and analyzed according to the methods of the invention.

In the case of fluorescent microspheres within a specimen block 12, fluorescence from depths underlying a surface layer within the block can be detected along with fluorescence from microspheres within a surface layer. For example, as may be seen in FIG. 5, in a rat heart specimen perfused first with a suspension containing microspheres of type A and then perfused with a suspension of microspheres of type B, when analyzed with the apparatus, and according to the methods of, our invention, manifested simultaneous fluorescences at more than one depth from the specimen. It is necessary to correct for these overlapping fluorescences in order to accurately compute regional circulatory flow. Accordingly, our invention further includes a computer software program installed in the microcomputer 90 for calculating circulatory flow in regions of the organ fixed in the specimen block 12 and for displaying on a computer monitor 91 a visual representation of circulatory flow utilizing horizontal (x) and vertical (y) coordinates, which corrects for overlapping fluorescences from fluorescent microspheres embedded in different layers of block 12, as follows:

Program Logic: Data Reduction and Storage

Threshold and erode the x,y coordinates of microspheres in each section removed from the specimen block 12.

A. Threshold each data set consisting of x,y coordinates stored on the hard disk for each layer removed from the specimen block 12 by deleting therefrom those having an optical intensity below some chosen threshold intensity level; and B. Perform erosion on each thresholded data set for each layer by resolving into a single x coordinate and a single y coordinate all closely spaced data points, i.e., all those data points for which $(x-\delta)<x<(x+\delta)$ and $(y-\delta)<y<(y+\delta)$, where $\delta$ is small compared to x and y.

C. Store the thresholded and eroded data sets in a file "TE" on the hard disk.

II. Delete redundant information representing the same microspheres detected in multiple layers of block 12.

A. The coordinates of microspheres $x^f$, $y^f$ in the final image as stored in file TE are saved in a new file, "FI";

B. The coordinates x'y' of microspheres in the next to last image are compared to the coordinates $x^f,y^f$ of the final image, the x',y' coordinates that correspond to $x^f$, $y^f$ within ± one pixel dimension are deleted together with their associated optical intensities, and the remainder of the x',y' coordinates and their associated optical intensities are saved in file TE on the hard disk.

C. The coordinates of microspheres x",y" in the second to last image are compared to the x',y' coordinates of the next to last image, the x",y" coordinates that correspond to x',y' within ± one pixel dimension are deleted together with their associated optical intensities, and the remainder of the x",y" coordinates and their associated optical intensities are saved in file TE.

D. Step C is repeated for the data sets representing the preceding images stored in TE, each time comparing the coordinates of microspheres in an image with the coordinates of microspheres in the preceding image, removing redundant coordinates and associated optical intensities from the latter image, and storing the modified data sets in file TE until all the data sets have been so processed, hereinafter referred to as "processed images."

One pixel dimension corresponding to 20 microns distance within the tissue block 12 gives generally satisfactory results.

When an animal or plant organ is perfused with a suspension of microspheres, the total volumetric flow F is measured during a measured period of time, T seconds. A computer software program is provided for calculating the regional circulatory flow (ml/cc per second) in each volume element, v (in cc's), of the organ, follows:

Program Logic: Flow Calculation

A. For a first processed image, divide the image into L volume elements, $v_i$, i=1 to L;

B. Calculate Regional Flow, $F_i$ into $v_i$, for i=1 to L:

$$F_i=(F/N)\times(N_i/v_i)$$

where N is the total number of microspheres introduced into the specimen and $N_i$ is the number of microspheres in volume element $v_i$;

C. Store $F_i$ for each volume element in a file on the hard disk;

D. Repeat steps A and B for each succeeding processed image.

III. Display flow density of microspheres as a function of each volume element $v_i$ on a computer monitor. Illustrative of the method of the invention as applied to determining regional circulatory flow in rat heart, an anesthetized Sprague-Dawley rat is sacrificed by exsanguination, and a peg heart preparation is established according to published methods, e.g., Barlow, C. H., and Chance, B., "Ischemic areas in perfused rat heart: measurement by NADH fluorescence photography," *Science* 93:909–910 (1976). The heart is initially perfused by a sonicated suspension of yellow-green fluorescent microspheres in 0.2% Tween 20 by injection into an inflow line attached to the aorta artery. Effluent is collected to detect untrapped microspheres. The organ physiology is challenged by, for example, increasing the cardiac work output or by decreasing the partial pressure of oxygen in the perfusate. A second sonicated suspension of microspheres in 0.2% Tween 20, this time utilizing rod microspheres, is injected into the inflow line and allowed to perfuse through the heart for a predetermined period of time. After completion of the study, the heart is frozen to form a specimen block, and the block is mounted in a cryomicrotome. Removal of surface layers from the specimen block, and detection, storage, and processing of images of the layers proceeds under automatic control of a microcomputer, thereby yielding an array of data sets as discussed hereinabove. Regional circulatory flow is calculated from the data sets and displayed on a computer monitor for each layer of the specimen block.

Alternative Embodiments

The usefulness of microsphere technology to measure regional flow in tissue may be greatly enhanced by using microspheres having diverse characteristics to create a historical record of flow over time in the same organ or animal. By using a first batch of spheres having one characteristic in a first intervention to indicate flow at an initial time, and using a second batch having a distinct second characteristic in a second intervention at a later time, a before and after comparison may be made in a single tissue sample.

For a simple example, the first batch of spheres may be coated with a rod fluorescent dye, and the second batch with a yellow dye. The rod batch is injected into the tissue as a "before" control intervention, then a scientific or medical procedure being evaluated is conducted on the tissue, then the yellow batch is injected to generate an "after" picture of the effects of the procedure. The tissue is then sectioned by the techniques discussed above. Using appropriate filters, the red and yellow data patterns may be determined for each section or slice of tissue to generate a complete picture of flow at each stage. Proper filtering avoids the yellow pattern from being read incorrectly as part of the rod pattern, and vice versa.

A succession of measurements may be made by this technique, using a unique and distinguishable characteristic such as fluorescent wavelength of sphere coating for each intervention in the succession of measurements. Thus, a series of snapshots may be made, limited in number only by the number of available dyes that may be uniquely distinguishable by filtering or other techniques. This approach may also be applied to techniques in which the bulk properties of microspheres is measured for each of numerous dissected volume elements, and is not limited to fluorescent colors, but may include different radioactive elements, different colored non-fluorescent spheres, and other different elements.

Where a long sequence of numerous interventions is desired, there may be insufficient distinguishable dye or other characteristics to provide a snapshot for each intervention. In that case, the microspheres may be coated with different permutations of several distinguishable dyes to provide a binary or Boolean "code" for the spheres of each intervention batch. For a given number "n" of spectroscopically distinguishable fluorometric dyes, the number of different logically distinguishable coded batches is $2^n-1$. If two dyes are used in the simplest case, three different interventions may be measured, one with rod dye, one with yellow dye, and one with both rod and yellow dyes mixed together on each microsphere coating. Because a batch of spheres without any coating (analogous to a binary zero cede) would not be visible or measurable, the number of cedes is one less than the theoretical $2^n$.

Normally, the practical limit to the number of interventions without the binary ceded approach is about 5 or 6, since determination of specific radioactive, color, or fluorescence characteristics against a background of contributions from other microspheres is difficult with more interventions. With the binary coded approach, each color (or appropriate characteristic) is analogous to a bit in a word; and the number of different colors yielding the length of the binary word. Thus, five colon generate a five bit word length, or 31 useful permutations. Six colon provide 63 useful permutations.

During optical or other appropriate analysis of each tissue section or volume element, it is necessary to distinguish each microsphere from any nearby spheres. Each identified individual sphere is analyzed for all colors that it emits. Conceptually, the sphere may be successively scanned with each of the appropriate excitation wavelengths, and imaged through a succession of appropriate filters. In preferable practice, the process is expedited by imaging each slice only once for each color, and generating a logical map of spheres for each color. In the computer's software, the maps are compared to identify each of those locations that are the source of more than one color emission. These are identified as the appropriate coded multicolored microspheres. This requires that the image process be precise to avoid a red-yellow sphere from being incorrectly identified as separate red and yellow spheres located near each other. Microsphere density and slice thickness must be limited to minimize the statistically inevitable error generated by overlapping or closely adjacent spheres. Maximizing the optical resolution of the system will also aid the spatial differentiation of spheres.

A preferred set up for use with seven groups of microspheres labeled with different permutations of three different dyes may be measured using three photomultiplier detectors with 488 nm excitation and three different emission filters. This provides for numerous interventions with limited equipment cost. In an alternative embodiment, microspheres having distinguishably different stepwise concentrations of a single fluorescent label may be used for multiple interventions. This approach requires a sensitive detection system to discriminate among the wide range of intensities, with each intensity corresponding to a different intervention.

Various modifications and changes will become obvious to those skilled in the art. It is the intent that these changes and modifications are to be encompassed within the spirit of the appended claims, and that the foregoing description and accompanying drawings be Considered as illustrative only and not intended to limit the scope of the invention.

We claim:

1. A method of analyzing fluid flow through a mass of tissue comprising the steps:

at a first time, injecting a first batch of first particles into the issue, each of the first particle having a first detectable characteristic;

at a later second time, injecting a second batch of second particles into the tissue, each of the second particles having a second detectable characteristic distinguishable from the first characteristic;

sequentially removing a plurality of planar layers from the tissue to expose a sequence of exposed surfaces of the tissue; and analyzing particles for each exposed surface of the tissue, including optically recording the position of each visible particle at the exposed surface, and for each visible particle, recording whether each visible particle has the first characteristic or the second characteristic determine fluid flow characteristics at the first and second times.

2. The method of claim 1 including the step of conducting an experimental procedure with the tissue after the first time and before the second time, such that fluid flow is analyzed before and after the procedure to analyze the effects of the procedure.

3. The method of claim 1 including the step, after injecting the second batch, injecting a third batch of third particles into the tissue, each of the third particles having the first characteristic and the second characteristic.

4. The method of claim 3 wherein the step of analyzing the particles includes, for each particle detected, determining whether the particle includes the first characteristic, the second characteristic, or both.

5. The method of claim 3 wherein the first and second characteristics are different wavelengths of light emitted.

6. The method of claim 3 wherein the third batch of particles fluoresces at at least two different distinguishable wavelengths.

7. The method of claim 1 wherein each of the particles is a microsphere coated with at least one color of fluorescent dye.

8. The method of claim 1 including illuminating the exposed surface to generate fluorescence of exposed particles.

9. A tissue analysis apparatus comprising:

a controller;

a slicer for segmenting the tissue into thin slices to reveal a sequence of exposed surfaces of the tissue;

an illuminator for illuminating the exposed surfaces;

an imager for detecting fluorescent particles in the exposed surfaces, for digitally recording the position of each particle, and for determining for each particle the wavelengths at which the particle fluoresces.

10. The apparatus of claim 9 wherein the imager includes a sensor for distinguishing between a particle fluorescing at a single color, and a particle fluorescing at more than one different color.

11. The apparatus of claim 9 wherein the imager includes a sensor for distinguishing between a single particle fluorescing at two different colors, and a pair of adjacent particles each fluorescing at a different one of the two different colors.

12. The apparatus of claim 10 wherein the sensor includes a plurality of filters, each selected to transmit a different limited range of wavelengths.

* * * * *